(No Model.)　　　　　　　　　　　　　　　2 Sheets—Sheet 1.
F. E. P'POOL.
KITCHEN CABINET.

No. 516,402.　　　　　　　　Patented Mar. 13, 1894.

WITNESSES:　　　　　　　　　　　　INVENTOR
J. A. Bergstrom　　　　　　　　　　F. E. P'Pool
C. Sedgwick　　　　　　　　　　BY
　　　　　　　　　　　　　　Munn & Co
　　　　　　　　　　　　　　ATTORNEYS.

THE NATIONAL LITHOGRAPHING COMPANY,
WASHINGTON, D. C.

(No Model.) 2 Sheets—Sheet 2.
F. E. P'POOL.
KITCHEN CABINET.
No. 516,402. Patented Mar. 13, 1894.
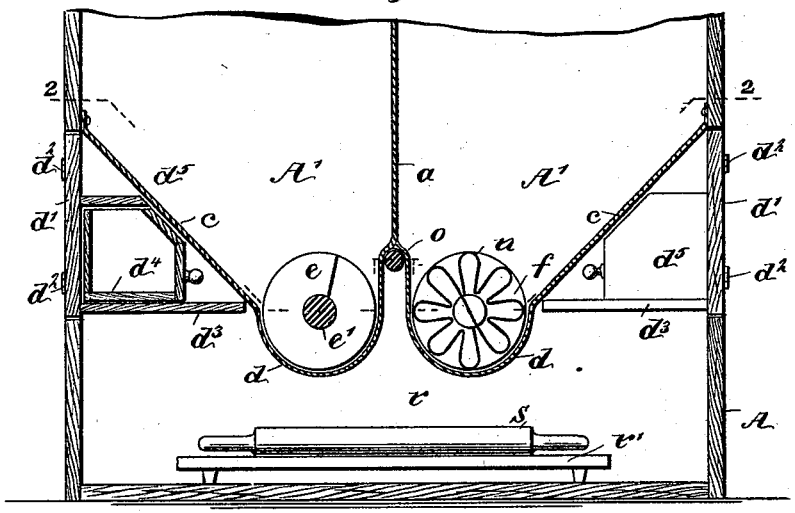
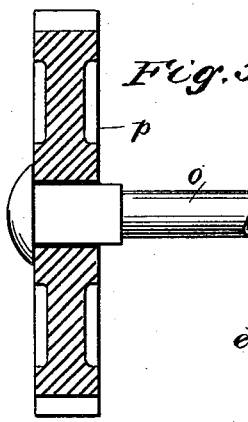
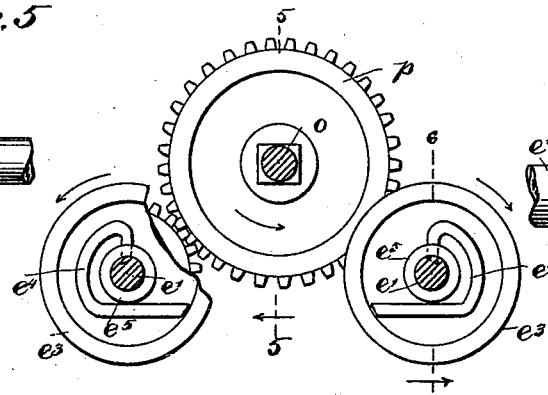
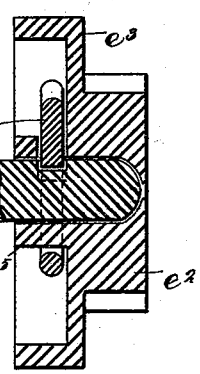
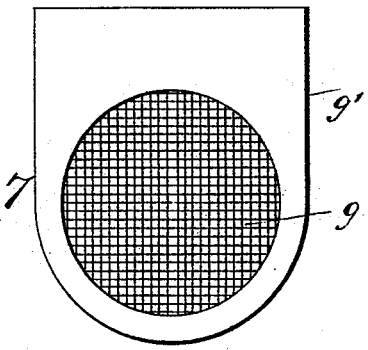
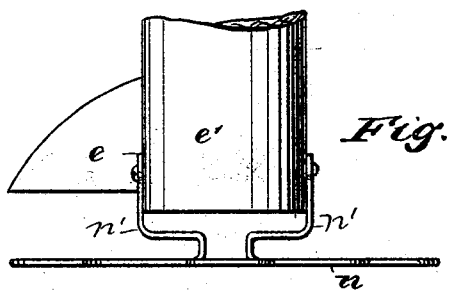
WITNESSES:
J. A. Bergstrom
C. Sedgwick
INVENTOR
F. E. P'Pool
BY Munn & Co.
ATTORNEYS.

UNITED STATES PATENT OFFICE.

FRANK E. P'POOL, OF BRANDON, TEXAS.

KITCHEN-CABINET.

SPECIFICATION forming part of Letters Patent No. 516,402, dated March 13, 1894.

Application filed April 26, 1893. Serial No. 471,895. (No model.)

*To all whom it may concern:*

Be it known that I, FRANK E. P'POOL, of Brandon, in the county of Hill and State of Texas, have invented a new and useful Improvement in Kitchen-Cabinets, of which the following is a full, clear, and exact description.

My invention relates to improvements in kitchen cabinets, and has for its objects to provide an article of kitchen furniture of the type indicated, which will embody novel and useful features of construction, that facilitate the storage of condiments and food articles of various sorts, in compact order, and adapted for easy access thereto, a depository for baking utensils being also furnished, and furthermore, a novel and convenient sifting device is provided for flour, that may be delivered thereby from sealed bins in the cabinet, in any desired quantity for use.

To these ends, my invention consists in the construction and combination of parts, as is hereinafter described and claimed.

Reference is to be had to the accompanying drawings forming a part of this specification, in which similar letters of reference indicate corresponding parts in all the figures.

Figure 1:
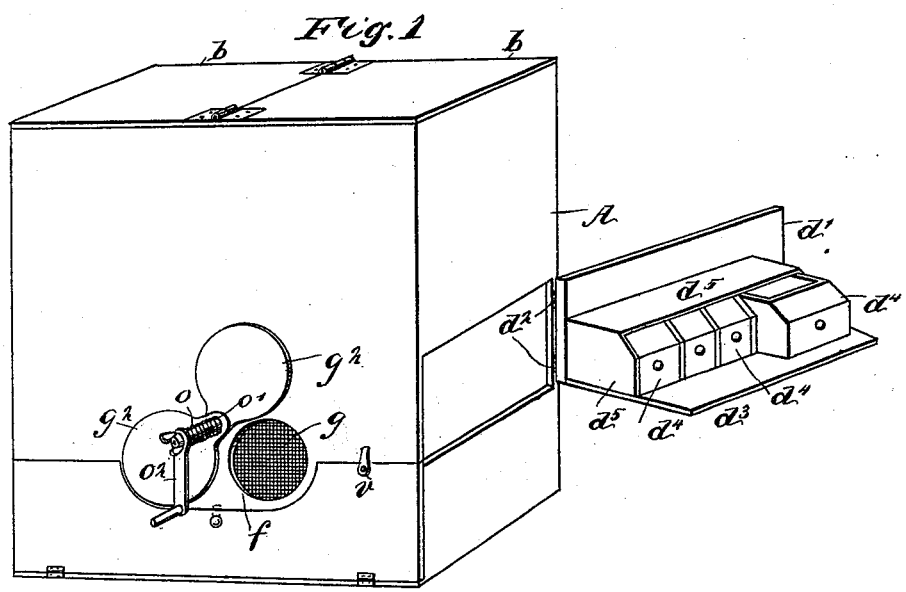
Figure 2:
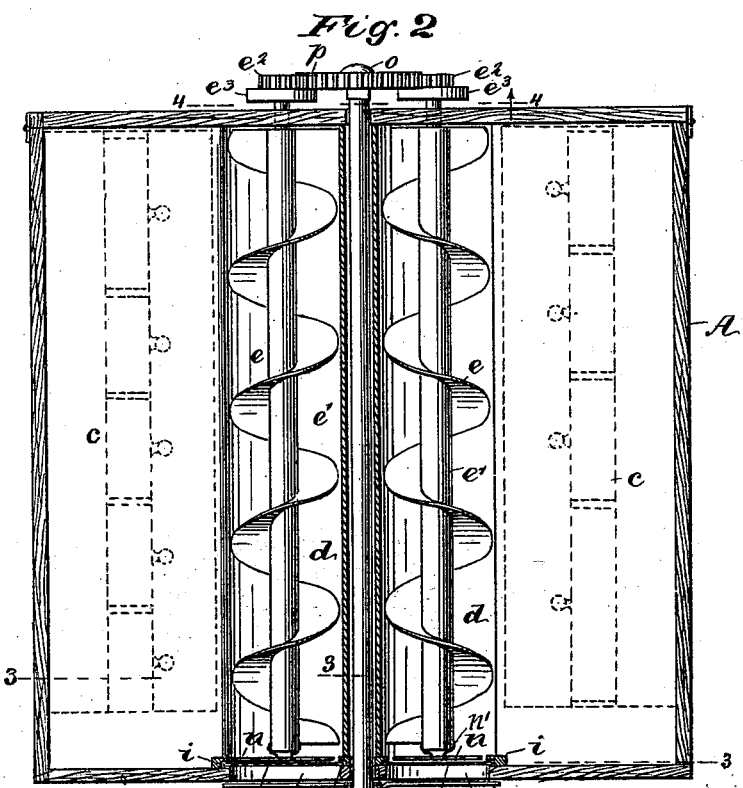

Figure 1 is a perspective view of the cabinet, parts being adjusted to show construction. Fig. 2 is a plan view, in section on the line 2—2 in Fig. 3. Fig. 3 is a transverse sectional view, on the line 3—3 in Fig. 2. Fig. 4 is a broken enlarged diagrammatic view, partly in section on the line 4—4 in Fig. 2, showing relative positions of gearing. Fig. 5 is an enlarged longitudinal sectional view on the line 5—5 in Fig. 4. Fig. 6 is an enlarged longitudinal sectional view on the line 6—6 in Fig. 4. Fig. 7 is a detached enlarged side view of a sifting device that is part of the improvement; and Fig. 8 is a detached enlarged plan view of another feature of the invention.

The cabinet A, is rectangular, and given any preferred dimensions, the upper portion being equally divided into two compartments A', by the central vertical partition $a$, thus forming two upright bins, access to which is had by openings at the top which are closed by the hinged lids $b$, see Figs. 1 and 3.

The bins A', are each provided with an inclined bottom wall $c$, that slopes downwardly from the side walls of the cabinet, to join the outer edges of the two similar conveyer troughs $d$; these troughs being arranged horizontally and extending from the front wall of the cabinet A to its rear wall, as also does the partition $a$. The sides of the troughs $d$, that are nearest to each other are spaced and vertically projected a proper degree, joining the wall $a$, as shown in Fig. 2, thus completing the bottoms of the compartments or bins A', and locating the troughs at the lowest point of each bin.

Within each trough $d$, a conveyer screw $e$, is placed, these similar screws being each formed on a center shaft $e'$, that is journaled at the rear end in the rear wall of the cabinet, as shown in Fig. 2, the diameter of the screws adapting them to loosely fit in the troughs $d$.

A circular aperture $f$, of proper diameter is produced in the front wall of the cabinet opposite each trough $d$, and of about the same radius.

On the inner surface of the front wall of each bin A', a woven wire screen $g$, one shown detached in Fig. 7, is removably supported and held by the loose engagement of the parallel side edges of its frame $g'$ with two rabbeted strips $i$, for each screen, these pairs of strips being secured vertical and parallel on the inner surface of the front wall of the cabinet, at such points as will locate the circular screen of each bin directly opposite the front end of the conveyer screw it is to receive flour from, as will be more fully explained. The length of the conveyer screws $e$, is proportioned to afford a space at the front ends of the same.

On the front end of each shaft $e'$, a peculiarly formed spring scraper $n$, is secured, these scrapers being of the same shape and dimensions, and as represented in Figs. 3 and 8, consist of a single wire strand bent into a number of loops that radiate from a center which conforms with the axis of the shaft $e'$, thus producing a number of integral radial spring scrapers in substantially the same plane, there being limbs $n'$, formed on the ends of the wire composing each scraper, which are bent rearwardly therefrom, and have contact at opposite points with the shaft $e'$ and are thereto secured, so that each radial looped scraper $n$, will be held projected forwardly of the conveyer screw it is connected with, and be adapted to have contact with the inner surface of the screen $g$. A main driving shaft $o$, is provided, which extends horizontally through the space between the upright walls of the troughs $d$, as shown in Figs. 2 and 3, said shaft having a rotatable support in opposite perforations formed for its accommodation in the front and rear walls of the cabinet A. The front end portion of the shaft $o$, is extended beyond the cabinet front wall, and on it is placed a spiral spring $o'$, which engages the wall of the cabinet with one end, and is pressed upon at its outer end by the hub of the crank handle $o^2$, that is adapted to slide upon a squared portion of the shaft $o$, the crank $o^2$, being adjusted longitudinally on the shaft by the nut $o^3$, that is screwed upon the threaded end of the shaft which projects beyond the crank handle.

On the shaft $o$, two cover plates $g^2$, are loosely secured, these similar plates having a contour that will adapt them to respectively close the apertures $f$, when adjusted to effect this; the adjustment of either cover plate serving to dispose it over one of the apertures or remove it therefrom, as indicated in Fig. 1, it being feasible to close both apertures if this is desired, this being the position given to the cover plates when a discharge of meal or flour from the bins $A'$, is not required.

On each projected rear end of the center shafts $e'$, a gear pinion $e^2$, is mounted and retained from displacement by means that will be described, these similar pinions having each a cupped enlargement $e^3$, integrally formed on the side that is in contact with the rear wall of the cabinet A, when the parts are assembled. A sufficient cavity is afforded by the cupped portion $e^3$, of each pinion $e^2$, to permit a spring dog $e^4$, to be therein located. The dogs $e^4$ are of like form, and each consists of a piece of spring metal in bar form, bent as shown in Figs. 4 and 6, so as to provide a hook on the free end that is made to pass through a hole in an annular collar $e^5$ and then enter a V-shaped notch in the shaft $e'$, the other ends of the spring dogs being secured in contact with the inner surfaces of the cupped enlargements $e^3$ on the pinions, the spring of the dogs causing the hooked ends of the dogs to normally engage the notches mentioned when brought opposite them. As shown in Fig. 6, the two spring dogs $e^4$ interlock with the shafts in opposite directions, and from the shape of the notches in the shafts, a rotation of each shaft in the direction of an adjacent curved arrow, will lock the shaft and toothed pinion together, a reverse movement permitting the dog to slip on the shaft and therefore fail to move the pinion, or be moved by said pinion if the latter is rotated in a direction to slip the dog carried by it.

On the rearwardly projected end of the main shaft $o$, a spur gear wheel $p$, is affixed, having its teeth meshed with those of the pinions $e^2$, thereby adapting this shaft to rotate one conveyer screw, if revolved in one direction, and the other screw if rotated in the other direction, and as shown in Fig. 2, the side of the gear wheel has a bearing on the outer surfaces of the enlargements $e^3$, thus adapting the spring $o'$, to press the shafts $e'$, forwardly and cause the scrapers $n$ to press on the screens $g$. Opposite each inclined bottom wall $c$, the side walls of the cabinet A, are similarly apertured, said holes that are parallel on top and bottom edges, extending from the front wall to the rear wall of the cabinet, as shown in Fig. 1.

The rectangular apertures in the cabinet's side walls are designed to receive the similar frames $d'$, that are each formed L-shaped in cross section, the upright wall of each frame being adapted to neatly fill the aperture it is opposite, when swung on the hinges $d^2$, that secure it by one end to the rear wall of the cabinet.

The horizontal piece $d^3$, of each frame $d'$, is the base of a series of drawers $d^4$, that have a sliding connection with a portion $d^5$, of the frame, the base piece $d^3$, affording support for all the drawers when they are slid outwardly from $d^5$, to permit access to their contents, as represented in Fig. 1. The shape of the frame portions $d^5$, is preferably made to conform with the inclination given to the bottom walls $c$, at their upper inner corners, and each frame portion named is subdivided by spaced vertical walls, to form guides for the drawers $d^4$, before mentioned.

The space between the bottom wall of the cabinet A and the walls $d^3$, together with the troughs $d$, affords a receptacle $r$ for a bakeboard $r'$, a rolling pin $s$, and such other implements as it may be desirable to store away therein. A door $u$, hinged at the front of the cabinet and shaped to clear the front ends of the troughs $d$, will when folded downwardly afford free access to the interior of the receptacle $r$, for the introduction or removal of the utensils mentioned, said door being retained in closed adjustment by the turn button $v$, or other equivalent means.

It will be seen, that the rotation of the crank handle $o^2$ in one direction will convey flour from one of the bins $A'$, forwardly against the screen $g$, and the simultaneous rotation of the scraper $n$, that is forwardly pressed, will cause the flour to be forced through the screen or sieve, and deliver it into any receptacle set below it, the door being lowered to permit the receptacle to be properly placed, (not shown,) the peculiar formation of the spring wire scraper $n$, causing a thorough comminution of all lumps of flour that may be formed in the bin, delivering the flour in a perfect sifted condition for use.

Two kinds of flour from cereals of different species may be stored in the bins $A'$, and be delivered therefrom as occasion may require, and it is evident that condiments, sugar, and flavoring extracts for baking purposes, may be conveniently stored in the drawers $d^4$, that from their location afford ready access to the articles that may be therein kept.

It is claimed that it is of great advantage to provide the removable screens or sieves $g$, hereinbefore described, as they may be readily taken out for cleaning and repair, and also be exchanged to place screens of different grades of fineness in position for service, in the cabinet.

Having thus described my invention, what I claim as new, and desire to secure by Letters Patent, is—

1. The combination with a casing apertured at its front and provided with a trough opposite said aperture, and a conveyer screw in the trough, of a scraper on the conveyer screw adjacent to the aperture, substantially as described.

2. The combination with a casing apertured at its front and provided with a trough opposite the aperture, and a conveyer screw in the trough, of a screen over the aperture, and a scraper on the conveyer screw adjacent to the screen and consisting of a number of radial spring arms, substantially as described.

3. The combination with a casing, a semi-cylindrical trough in the lower part of the casing, opposite an aperture in the front wall of the casing, and a vertical removable screen over the aperture, of a conveyer screw rotatable in the trough, and spring pressed toward the screen, and a spring scraper device fast on the conveyer screw and adapted to stir material received from the screw and discharge it through the screen, substantially as described.

4. The combination with a rectangular casing apertured at its front, upright bins in the casing, troughs at the bottoms of said bins, and conveyer screws rotatable in said troughs, of vertical screens covering the apertures in the casing opposite one end of the troughs and screws, spring scraper devices on the ends of the screws, adapted to scrape the surface of the screens, gearing for rotating the screws alternately and oppositely, and means for operating the gearing, substantially as described.

5. The combination with a rectangular casing apertured at its front, upright bins in the casing formed by a vertical central partition, said bins having inwardly inclined bottoms, and being provided with lids, of semi-cylindrical troughs in the bottoms of said bins, vertical detachable screens covering the apertures in the casing at one end of the conveyer screws and troughs, exterior cover plates for said apertures, spring scraper devices on the screws, adapted to engage said screens, gearing to alternately and oppositely rotate the screws, and means for operating the gearing, substantially as described.

FRANK E. P'POOL.

Witnesses:
M. H. JONES,
P. K. SPINK.